(12) United States Patent
Ballard

(10) Patent No.: US 10,035,437 B1
(45) Date of Patent: Jul. 31, 2018

(54) COLLAPSIBLE STROLLER ASSEMBLY

(71) Applicant: Eddie Ballard, Glendale, CA (US)

(72) Inventor: Eddie Ballard, Glendale, CA (US)

( * ) Notice: Subject to any disclaimer, the term of this patent is extended or adjusted under 35 U.S.C. 154(b) by 0 days.

(21) Appl. No.: 15/590,059

(22) Filed: May 9, 2017

(51) Int. Cl.
*B60N 2/28* (2006.01)
*B62B 7/12* (2006.01)

(52) U.S. Cl.
CPC .......... *B60N 2/286* (2013.01); *B60N 2/2842* (2013.01); *B60N 2/2845* (2013.01); *B60N 2/2848* (2013.01); *B62B 7/12* (2013.01)

(58) Field of Classification Search
CPC ........ B60N 2/26; B60N 2/286; B60N 2/2842; B60N 2/2848; B62B 7/12; A47D 1/06
See application file for complete search history.

(56) References Cited

U.S. PATENT DOCUMENTS

| | | | |
|---|---|---|---|
| 4,946,180 A * | 8/1990 | Baer | A47D 1/008 280/39 |
| 4,989,888 A * | 2/1991 | Qureshi | B60N 2/2848 280/30 |
| 5,505,519 A * | 4/1996 | Natt | B60N 2/28 297/250.1 |
| 6,237,995 B1 * | 5/2001 | Dierickx | B60N 2/2848 280/648 |
| 6,910,696 B2 | 6/2005 | Bargery | |
| D508,220 S | 8/2005 | Spriggs et al. | |
| 6,986,518 B1 | 1/2006 | Besaw | |
| 7,543,886 B2 | 6/2009 | Guitierrez-Hedges et al. | |
| 7,600,766 B2 | 10/2009 | Erskine | |
| 8,801,028 B2 * | 8/2014 | Mazar | B60N 2/2845 280/30 |
| 2002/0060444 A1 | 5/2002 | Cote | |

* cited by examiner

Primary Examiner — Erez Gurari

(57) ABSTRACT

A collapsible stroller assembly for combining a car seat and a stroller includes a car seat that has a chair portion and a backrest portion. The car seat is selectively positioned in a vehicle. A plurality of rollers is provided and each of the rollers is pivotally coupled to the car seat. Each of the rollers is selectively positioned in a deployed position to roll along a support surface. Each of the rollers is selectively positioned in a stored position. An audio unit is coupled to the car seat to emit audible sound. The audio unit is selectively placed in electrical communication with an extrinsic electronic device to receive an audio signal.

16 Claims, 6 Drawing Sheets

COLLAPSIBLE STROLLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to stroller devices and more particularly pertains to a new stroller device for combining a car seat and a stroller.

BRIEF SUMMARY OF THE INVENTION

An embodiment of the disclosure meets the needs presented above by generally comprising a car seat that has a chair portion and a backrest portion. The car seat is selectively positioned in a vehicle. A plurality of rollers is provided and each of the rollers is pivotally coupled to the car seat. Each of the rollers is selectively positioned in a deployed position to roll along a support surface. Each of the rollers is selectively positioned in a stored position. An audio unit is coupled to the car seat to emit audible sound. The audio unit is selectively placed in electrical communication with an extrinsic electronic device to receive an audio signal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
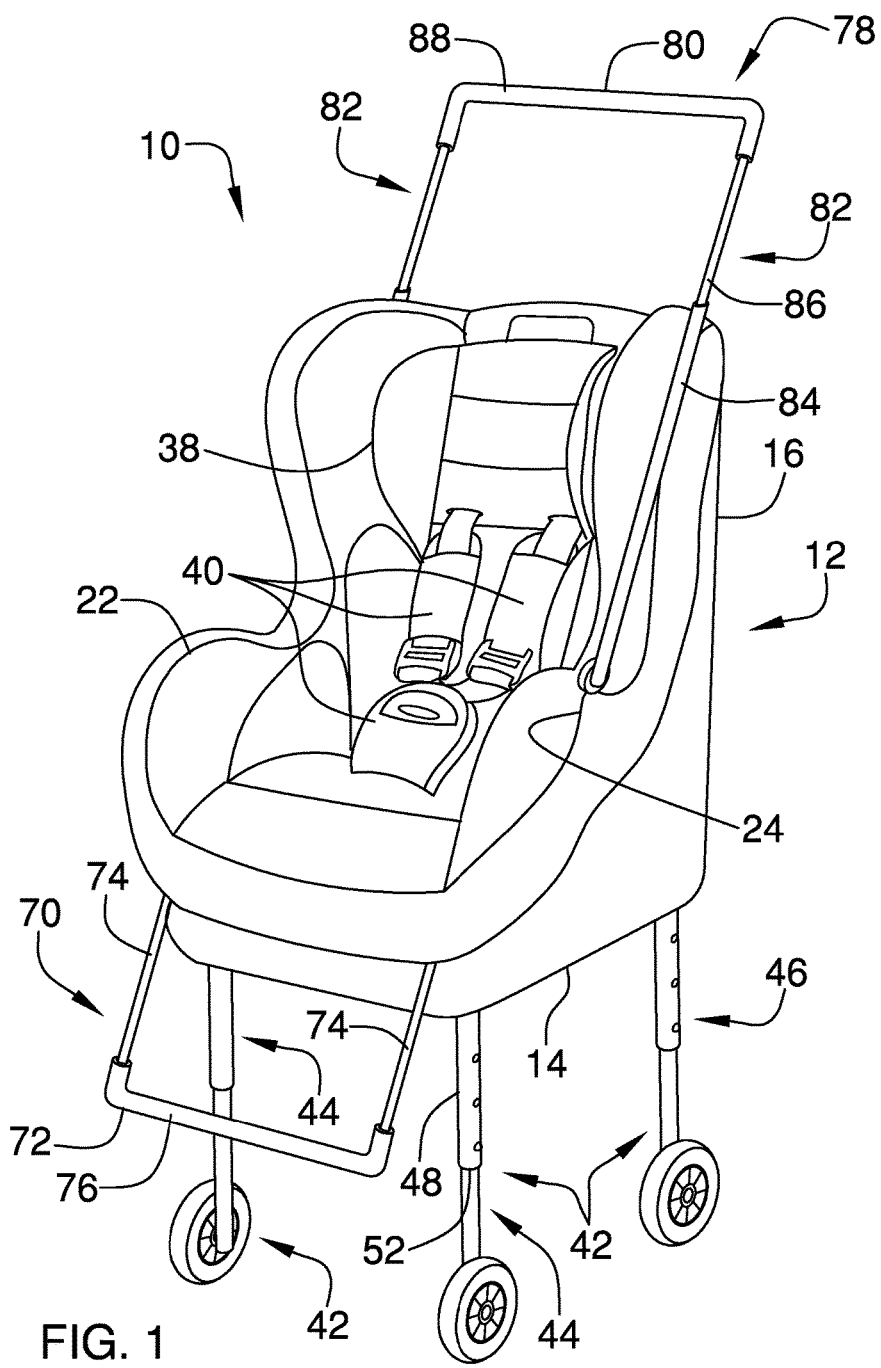
FIG. 1 is a front perspective view of a collapsible stroller assembly according to an embodiment of the disclosure.
Figure 2:
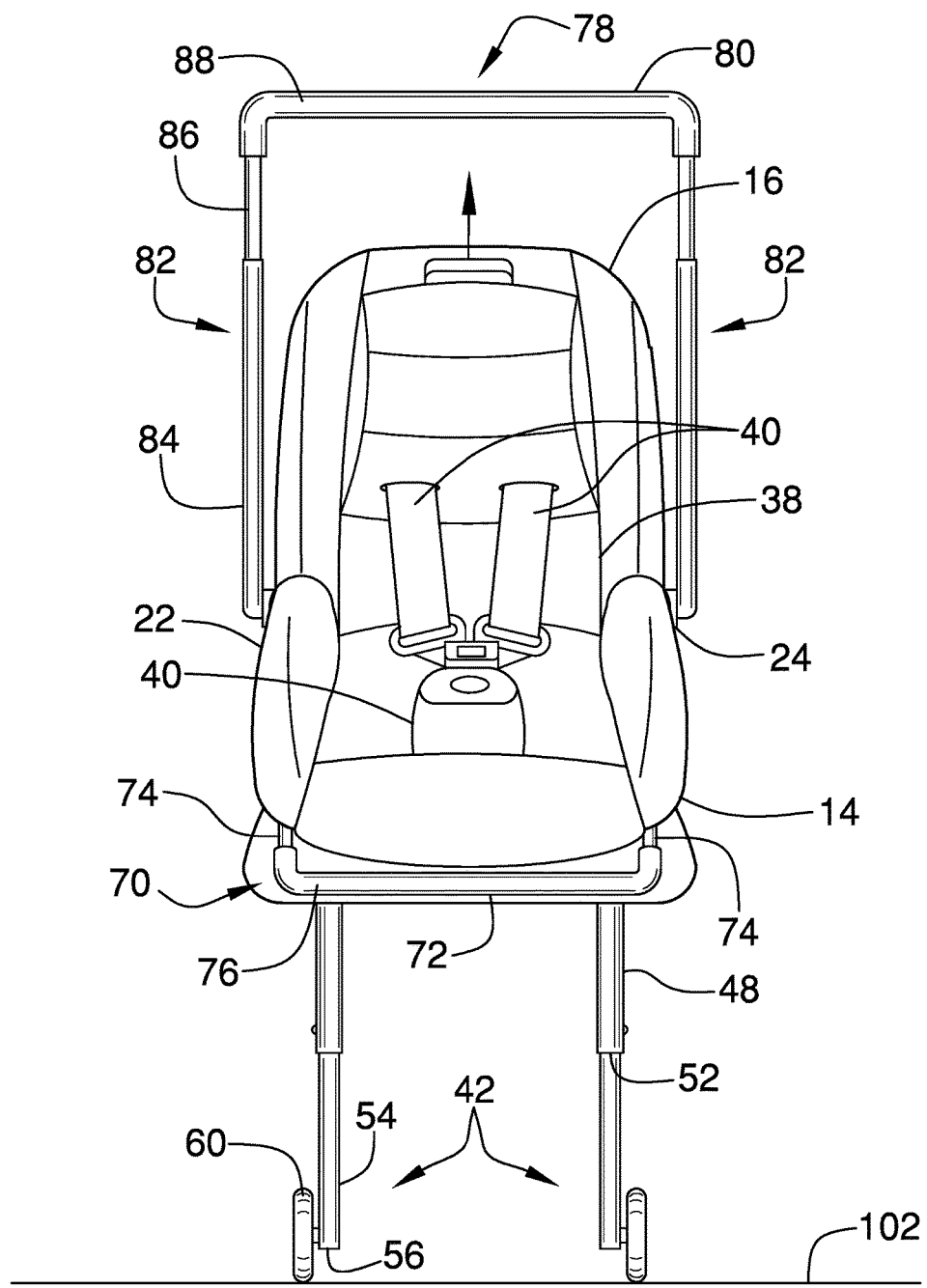
FIG. 2 is a front view of an embodiment of the disclosure.
Figure 3:
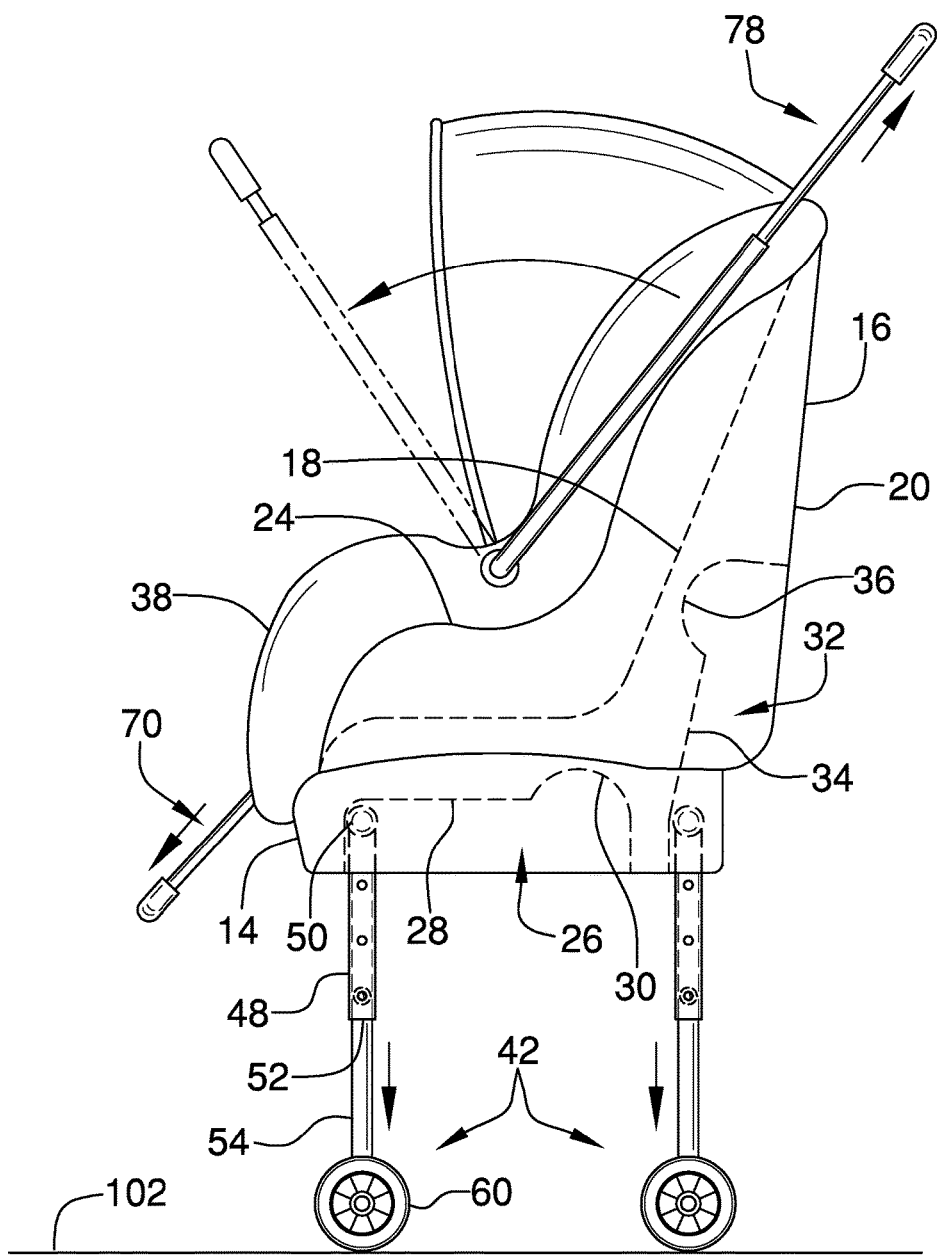
FIG. 3 is a left side phantom view of an embodiment of the disclosure.
Figure 4:
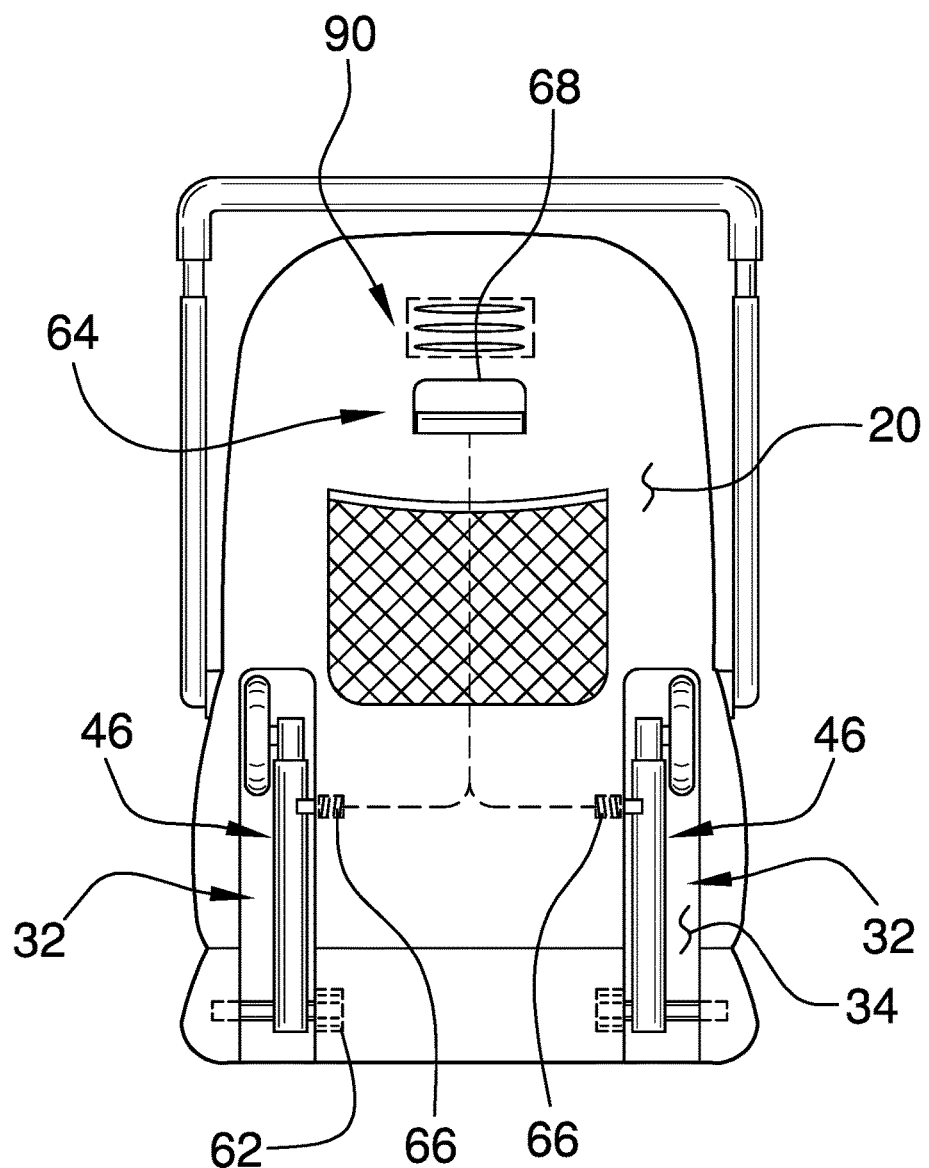
FIG. 4 is a back phantom view of an embodiment of the disclosure.
Figure 5:
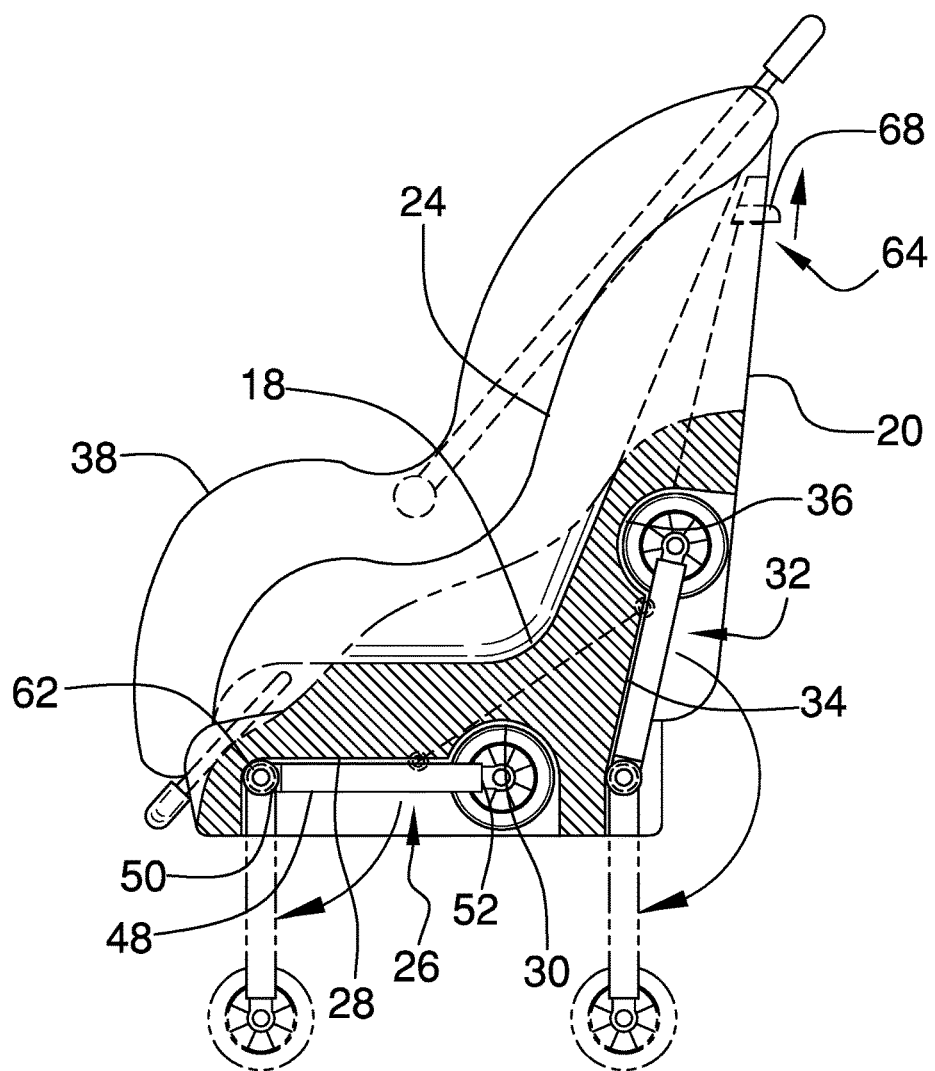
FIG. 5 is a left side cut-away view of an embodiment of the disclosure.
Figure 6:
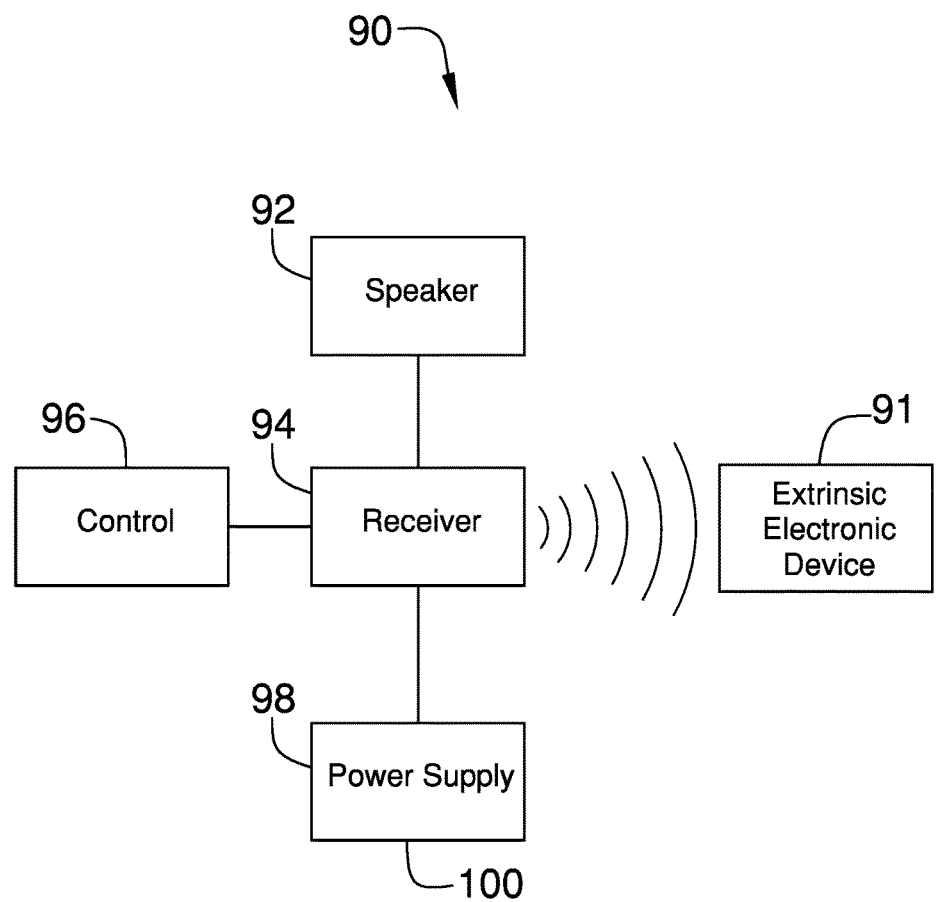
FIG. 6 is a schematic view of an embodiment of the disclosure.

With reference now to the drawings, and in particular to FIGS. 1 through 6 thereof, a new stroller device embodying the principles and concepts of an embodiment of the disclosure and generally designated by the reference numeral 10 will be described.

As best illustrated in FIGS. 1 through 6, the collapsible stroller assembly 10 generally comprises a car seat 12 that has a chair portion 14 and a backrest portion 16. The car seat 12 has a first surface 18, a second surface 20, a first lateral wall 22 and a second lateral wall 24. Each of the first 22 and second 24 lateral walls extends forwardly beyond the first surface 18 corresponding to each of the chair portion 14 and the backrest portion 16. The first 22 and second 24 lateral walls are spaced apart form each other to retain a child in the car seat 12. Moreover, the car seat 12 may be a child car seat 12 of any conventional design.

The second surface 20 corresponding to the chair portion 14 has a pair of first wells 26 extending toward the first surface 18 corresponding to the chair portion 14. Moreover, each of the first wells 26 is aligned with an associated one of the first 22 and second 24 lateral walls and each of the first wells 26 has an upper bounding surface 28. The upper bounding surface 28 corresponding to each of the first wells 26 has a wheel section 30. The wheel section 30 is concavely arcuate with respect to the second surface 20.

The second surface 20 corresponding to the backrest portion 16 has a pair of second wells 32 extending toward the first surface 18 corresponding to the backrest portion 16. Each of the second wells 32 is aligned with an associated one of the first 22 and second 24 lateral walls and each of the second wells 32 has a forward bounding surface 34. The forward bounding surface 34 corresponding to each of the second wells 32 has a wheel section 36. Moreover, the wheel section 36 corresponding to each of the second wells 32 is concavely arcuate with respect to the second surface 20. Each of the second wells 32 extends through an intersection of the chair portion 14 and the backrest portion 16 and the wheel section 36 of each of the second wells 32 is spaced from the intersection.

A pad 38 is provided and the pad 38 is positioned on the car seat 12. The pad 38 is positioned on the first surface 18 corresponding to each of the chair portion 14 and the backrest portion 16. A set of belts 40 is provided and the set of belts 40 is coupled the car seat 12. The set of belts 40 are selectively matable to retain the child in the car seat 12.

A plurality of rollers 42 is provided and each of the rollers 42 is pivotally coupled to the car seat 12. Each of the rollers 42 is selectively positioned in a deployed position to roll along a support surface 42. In this way the car seat 12 is manipulated in the convention of a stroller. Each of the rollers 42 is selectively positioned in a stored position to facilitate the car seat 12 to be positioned on a seat in a vehicle. In this way the car seat 12 is employed in the convention of car seats.

The plurality of rollers 42 includes a pair of first rollers 44 and a pair of second rollers 46. Each of the plurality of rollers 42 comprises a tube 48 that has a first end 50 and a second end 52. The first end 50 corresponding to each of the first rollers 44 is pivotally coupled to the upper bounding surface 28 of an associated one of the first wells 26. The tube 48 corresponding to each of the first rollers 44 extends downwardly from the chair portion 14 when the first rollers 44 are positioned in the deployed position. The first end 50 corresponding to each of the second rollers 46 is pivotally coupled to the forward bounding surface 34 of an associated one of the second wells 32. The tube 48 corresponding to each of the second rollers 46 extends downwardly from the intersection when the second rollers 46 are positioned in the deployed position.

Each of the rollers 42 includes a rod 54 that is slidably inserted into the second end 52 of the tube 48. The rod 54 has a distal end 56 with respect to the second end 52. A lock 58 is movably coupled to the rod 54 and the lock 58 is selectively manipulated. The lock 58 engages the tube 48 at a selected point such that each of the rollers 42 has a telescopically adjustable length. The lock 58 may be a spring loaded ball or the like. Additionally, the lock 58 may engage a selected one of a plurality of apertures in the tube 48.

Each of the rollers 42 includes a wheel 60 that is rotatably coupled to the distal end 56 of the rod 54. The wheel 60 rolls along the support surface 42 when the rollers 42 are positioned in the deployed position. Additionally, the wheel 60 corresponding to each of the first rollers 44 is positioned in the wheel 60 section of an associated one of the first wells 26 when each of the first rollers 44 is positioned in the stored position. The wheel 60 corresponding to each of the second rollers 46 is positioned in the wheel 60 section of an associated one of the second wells 32 when each of the second rollers 46 is positioned in the stored position.

Each of the rollers 42 includes a hinge 62 and the hinge 62 is coupled between the tube 48 and the car seat 12. The hinge 62 corresponding to each of the rollers 42 is a spring loaded hinge 62 and the hinge 62 biases the corresponding roller into the deployed position. A locking mechanism 64 is coupled to the car seat 12 and the locking mechanism 64 engages each of the rollers 42 when the rollers 42 are positioned in the stored position. In this way the rollers 42 are retained in the stored position.

The locking mechanism 64 includes a plurality of pins 66 that are each movably positioned in the car seat 12. Each of the pins 66 is aligned with and associated one of the first 26 and second 32 wells. Moreover, each of the pins 66 is biased to extend into the associated first 26 and second 32 wells. Each of the pins 66 engages the tube 48 of the corresponding roller 42 when the corresponding roller 42 is positioned in the stored position. A release 68 is movably coupled to the car seat 12 and the release 68 is selectively manipulated. The release 68 is mechanically coupled to each of the pins 66 via a cable or any other conventional mechanicals means. The release 68 urges each of the pins 66 to disengage from the corresponding roller 42 when the release 68 is manipulated. Thus, the hinge 62 corresponding to each of the rollers 42 biases the corresponding roller 42 into the deployed position. The release 68 may be positioned on the second surface 20 corresponding to the back rest portion of the car seat 12.

A leg rest 70 is provided and the leg rest 70 is slidably coupled to the car seat 12. The leg rest 70 comprises a central member 72 extending between a pair of outward members 74. Each of the outward members 74 is slidably coupled to the second surface 20 of the chair portion 14. In this way the central member 72 is spaceable a selected distance from the chair portion 14. The central member 72 is urged outwardly from the car seat 12 when the rollers 42 are positioned in the deployed position. In this way each of the child's feet is selectively positioned on the central member 72 when the car seat 12 is rolled along the support surface 42. A first cushion 76 is positioned around the central member 72 to enhance comfort of the central member 72.

A handle 78 is provided and the handle 78 is pivotally coupled to the car seat 12. The handle 78 comprises a middle member 80 extending between a pair of outside members 82. Each of the outside members 82 has a first section 84 that is slidably coupled to a second section 86. In this way the handle 78 has a telescopically adjustable length. The first section 84 corresponding to each of the outside members 82 is positioned on an associated one of the first 22 and second 24 lateral walls. The middle member 80 extends between the second section 86 corresponding to each of the outside members 82. A second cushion 88 is positioned around the middle member 80 to enhance gripping the middle member 80.

The handle 78 is selectively positioned in a first position having the handle 78 angling rearwardly from the car seat 12. The handle 78 is positioned in the first position when the rollers 42 are positioned in the deployed position. In this way the handle 78 is gripped to urge the car seat 12 along the support surface 42. The handle 78 is selectively positioned in a second position having the handle 78 angling forwardly from the car seat 12. The handle 78 is positioned in the second position when the rollers 42 are positioned in the stored position. In this way the handle 78 is gripped to position the car seat 12 in the vehicle.

A canopy may be provided and the canopy may be removably coupled to the car seat 12. The canopy may be positioned to extend forwardly from the backrest section to shade the child. The canopy may be a foldable canopy of any conventional design.

An audio unit 90 is provided and the audio unit 90 is coupled to the car seat 12 to emit audible sound. The audio unit 90 is selectively placed in electrical communication with an extrinsic electronic device 91 to receive an audio signal. The extrinsic electronic device 91 may be a smart phone or other electronic device that can wirelessly transmit an audio signal.

The audio unit 90 comprises a speaker 92 that is coupled to the car seat 12 and the speaker 92 emits the audible sound. The speaker 92 may be an electronic speaker 92 or the like. A receiver 94 is coupled to the car seat 12 and the receiver 94 is selectively placed in wireless electrical communication with the extrinsic electronic device 91. The receiver 94 is electrically coupled to the speaker 92 such that the speaker 92 receives the audio. The receiver 94 may be a radio frequency receiver 94 and the receiver 94 may employ a WPAN signal and Bluetooth communication protocols. Moreover, the audible sound may be music or any other audible sound.

A control 96 is coupled to the car seat 12 and the control 96 is selectively manipulated. The control 96 is electrically coupled to the receiver 94 to control 96 operational parameters of the receiver 94. The control 96 may include a plurality of buttons or any other conventional means of electronically controlling the receiver 94. A power supply 98 is coupled to the car seat 12 and the power supply 98 is electrically coupled to the receiver 94. The power supply 98 comprises at least one battery 100.

In use, each of the rollers 42 is positioned in the stored position and the child is placed in the car seat 12. The set of belts 40 is mated to retain the child in the car seat 12 and the handle 78 is positioned in the second position. The handle 78 is gripped to position the car seat 12 in the vehicle and the car seat 12 is secured in the vehicle with seatbelts 40 in the vehicle. In this way the car seat 12 secures the child in the vehicle.

The handle 78 is gripped to remove the child and the car seat 12 from the vehicle. The release 68 is manipulated to facilitate each of the rollers 42 to be biased into the deployed position. In this way the car seat 12 is rolled along the support surface 42 in the convention of a stroller. The handle 78 is positioned in the first position and the handle 78 is gripped to urge the car seat 12 along the support surface 42. Additionally, the leg rest 70 is manipulated to facilitate the child's feet to be rested on the leg rest 70. The control 96 is manipulated to synch the receiver 94 with the extrinsic electronic device 91. In this way the speaker 92 emits the audible sound for the pleasure of the child.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible stroller assembly being configured to be selectively positioned in a vehicle as a car seat, said assembly comprising:
    a car seat having a chair portion and a backrest portion, said car seat being configured to be positioned in a vehicle, said car seat has a first surface, a second surface, a first lateral wall and a second lateral wall, each of said first and second lateral walls extending forwardly beyond said first surface corresponding to each of said chair portion and said backrest portion;
    a plurality of rollers, each of said rollers being pivotally coupled to said car seat, each of said rollers being selectively positioned in a deployed position wherein each of said rollers is configured to roll along a support surface, each of said rollers being selectively positioned in a stored position wherein said car seat is configured to be positioned on the seat in the vehicle;
    a leg rest being slidably coupled to said car seat such that said leg rest slides outwardly from within said car seat, said leg rest comprising a central member extending between a pair of outward members, each of said outward members being slidably coupled to said second surface of said chair section wherein each of said outward members slide outwardly and downwardly from within said car seat such that said central member is spaceable a selected distance from said chair section, said central member being configured to have feet positioned thereon wherein the feet support the legs of a person, said central member comprising a rod;
    a handle being pivotally coupled to said car seat wherein said handle is configured to be gripped; and
    an audio unit being coupled to said car seat wherein said audio unit is configured to emit audible sound, said audio unit being configured to be in electrical communication with an extrinsic electronic device thereby facilitating said audio unit to receive an audio signal.

2. The assembly according to claim 1, wherein:
    said car seat has a first surface, a second surface, a first lateral wall and a second lateral wall, each of said first and second lateral walls extending forwardly beyond said first surface corresponding to each of said chair portion and said backrest portion; and
    said second surface corresponding to said chair portion has a pair of first wells extending toward said first surface corresponding to said chair portion, each of said first wells being aligned with an associated one of said first and second lateral walls, each of said first wells having an upper bounding surface, upper bounding surface corresponding to each of said first wells having a wheel section, said wheel section being concavely arcuate with respect to said second surface.

3. The assembly according to claim 2, wherein said second surface corresponding to said backrest portion has a pair of second wells extending toward said first surface corresponding to said backrest portion, each of said second wells being aligned with an associated one of said first and second lateral walls, each of said second wells having an forward bounding surface, forward bounding surface corresponding to each of said second wells having a wheel section, said wheel section corresponding to each of said second wells being concavely arcuate with respect to said second surface, each of said second wells extending through an intersection of said chair portion and said backrest portion having said wheel section of each of said second wells being spaced from said intersection.

4. The assembly according to claim 3, wherein said plurality of rollers includes a pair of first rollers and a pair of second rollers, each of said plurality of rollers comprises a tube having a first end and a second end, said first end corresponding to each of said first rollers being pivotally coupled to said upper bounding surface of an associated one of said first wells, said tube corresponding to each of said first rollers extending downwardly from said chair portion when said first rollers are positioned in said deployed position, said first end corresponding to each of said second rollers being pivotally coupled to said forward bounding surface of an associated one of said second wells, said tube corresponding to each of said second rollers extending downwardly from said intersection when said second rollers are positioned in said deployed position.

5. The assembly according to claim 4, further comprising a rod being slidably inserted into said second end of said tube, said rod having a distal end with respect to said second end.

6. The assembly according to claim 5, further comprising a lock being movably coupled to said rod wherein said lock is configured to be manipulated, said lock engaging said tube at a selected point such that each of said rollers has a telescopically adjustable length.

7. The assembly according to claim 5, further comprising a wheel being rotatably coupled to said distal end of said rod, said wheel being configured to roll along the support surface when said rollers is positioned in said deployed position.

8. The assembly according to claim 7, wherein said wheel corresponding to each of said first rollers is positioned in said wheel section of an associated one of said first wells when each of said first rollers is positioned in said stored position.

9. The assembly according to claim 7, wherein said wheel corresponding to each of said second rollers is positioned in said wheel section of an associated one of said second wells when each of said second rollers is positioned in said stored position.

10. The assembly according to claim 1, further comprising a first cushion being positioned around said central member.

11. The assembly according to claim 2, wherein said handle comprises a middle member extending between a pair of outside members, each of said outside members having a first section being slidably coupled to a second section such that said handle has a telescopically adjustable length, said first section corresponding to each of said outside members being positioned on an associated one of said first and second lateral walls, said middle member extending between said second section corresponding to each of said outside members.

12. The assembly according to claim 11, wherein said handle is selectively positioned in a first position having said handle angling rearwardly from said car seat, said handle being selectively positioned in a second position having said handle angling forwardly from said car seat.

13. The assembly according to claim 1, wherein said audio unit comprises a speaker being coupled to said car seat wherein said speaker is configured to emit the audible sound.

14. The assembly according to claim 13, further comprising a receiver being coupled to said car seat wherein said receiver is configured to be in wireless electrical communication with the extrinsic electronic device, said receiver being electrically coupled to said speaker such that said speaker receiver the audio.

15. The assembly according to claim 14, further comprising a power supply being coupled to said car seat, said power supply being electrically coupled to said receiver, said power supply comprising at least one battery.

16. A collapsible stroller assembly being configured to be selectively positioned in a vehicle as a car seat, said assembly comprising:
  a car seat having a chair portion and a backrest portion, said car seat having a first surface, a second surface, a first lateral wall and a second lateral wall, each of said first and second lateral walls extending forwardly beyond said first surface corresponding to each of said chair portion and said backrest portion, said second surface corresponding to said chair portion having a pair of first wells extending toward said first surface corresponding to said chair portion, each of said first wells being aligned with an associated one of said first and second lateral walls, each of said first wells having an upper bounding surface, upper bounding surface corresponding to each of said first wells having a wheel section, said wheel section being concavely arcuate with respect to said second surface, said second surface corresponding to said backrest portion having a pair of second wells extending toward said first surface corresponding to said backrest portion, each of said second wells being aligned with an associated one of said first and second lateral walls, each of said second wells having an forward bounding surface, forward bounding surface corresponding to each of said second wells having a wheel section, said wheel section corresponding to each of said second wells being concavely arcuate with respect to said second surface, each of said second wells extending through an intersection of said chair portion and said backrest portion having said wheel section of each of said second wells being spaced from said intersection;
  a cushion being positioned on said car seat wherein said cushion is configured to be sat upon, said cushion being positioned on said first surface corresponding to each of said chair portion and said backrest portion;
  a plurality of rollers, each of said rollers being pivotally coupled to said car seat, each of said rollers being selectively positioned in a deployed position wherein each of said rollers is configured to roll along a support surface, each of said rollers being selectively positioned in a stored position wherein said car seat is configured to be positioned on a seat in a vehicle, said plurality of rollers including a pair of first rollers and a pair of second rollers, each of said plurality of rollers comprising:
    a tube having a first end and a second end, said first end corresponding to each of said first rollers being pivotally coupled to said bounding surface of an associated one of said first wells, said tube corresponding to each of said first rollers extending downwardly from said chair portion when said first rollers are positioned in said deployed position, said first end corresponding to each of said second rollers being pivotally coupled to said bounding surface of an associated one of said second wells, said tube corresponding to each of said second rollers extending downwardly from said intersection when said second rollers are positioned in said deployed position;
    a rod being slidably inserted into said second end of said tube, said rod having a distal end with respect to said second end;
    a lock being movably coupled to said rod wherein said lock is configured to be manipulated, said lock engaging said tube at a selected point such that each of said rollers has a telescopically adjustable length; and
    a wheel being rotatably coupled to said distal end of said rod, said wheel being configured to roll along the support surface when said rollers is positioned in said deployed position, said wheel corresponding to each of said first rollers being positioned in said wheel section of an associated one of said first wells when each of said first rollers is positioned in said stored position, said wheel corresponding to each of said second rollers being positioned in said wheel section of an associated one of said second wells when each of said second rollers is positioned in said stored position;

a leg rest being slidably coupled to said car seat, said leg rest comprising a central member extending between a pair of outward members, each of said outward members being slidably coupled to said second surface of said chair section such that said central member is spaceable a selected distance from said chair section wherein said central member is configured to have feet positioned thereon;

a first cushion being positioned around said central member;

a handle being pivotally coupled to said car seat wherein said handle is configured to be gripped, said handle comprising a middle member extending between a pair of outside members, each of said outside members having a first section being slidably coupled to a second section such that said handle has a telescopically adjustable length, said first section corresponding to each of said outside members being positioned on an associated one of said first and second lateral walls, said middle member extending between said second section corresponding to each of said outside members, said handle being selectively positioned in a first position having said handle angling rearwardly from said car seat, said handle being selectively positioned in a second position having said handle angling forwardly from said car seat;

a second cushion being positioned around said middle member; and an audio unit being coupled to said car seat wherein said audio unit is configure to emit audible sound, said audio unit being configured to be in electrical communication with an extrinsic electronic device thereby facilitating said audio unit to receive an audio signal, said audio unit comprising:

a speaker being coupled to said car seat wherein said speaker is configured to emit the audible sound, a receiver being coupled to said car seat wherein said receiver is configured to be in wireless electrical communication with the extrinsic electronic device, said receiver being electrically coupled to said speaker such that said speaker receiver the audio, a control being coupled to said car seat wherein said control is configured to be manipulated, said control being electrically coupled to said receiver such that said control controls operational parameters of said receiver; and a power supply being coupled to said car seat, said power supply being electrically coupled to said receiver, said power supply comprising at least one battery.

\* \* \* \* \*